United States Patent [19]

Hotta et al.

[11] 4,327,427
[45] Apr. 27, 1982

[54] SYSTEM OF AUTOMATICALLY CONTROLLING DISTANCE IN LINEAR MOVEMENT

[75] Inventors: Mitsuhiko Hotta; Akifumi Tachibana, both of Kyoto; Takanori Shigihara, Hyogo, all of Japan

[73] Assignee: Kabushiki Kaisha Morita Seisakusho, Kyoto, Japan

[21] Appl. No.: 165,387

[22] Filed: Jul. 3, 1980

[30] Foreign Application Priority Data

Jul. 4, 1979 [JP] Japan .................. 54-85320

[51] Int. Cl.³ .................................. G01S 11/00
[52] U.S. Cl. ........................ 367/118; 367/96
[58] Field of Search ............... 367/96, 118, 117, 127, 367/138, 140, 162, 176; 310/326, 327

[56] References Cited

U.S. PATENT DOCUMENTS

3,427,481  2/1969  Lenahan et al. ............. 367/162 X
3,824,464  7/1974  Rotier et al. ................ 367/118
4,084,149  4/1978  Driver et al. ................ 367/96

Primary Examiner—Richard A. Farley
Attorney, Agent, or Firm—Koda and Androlia

[57] ABSTRACT

The disclosure relates to a system of automatically controlling the distance between two members placed in a relatively variable relation with each other with respect to distance on a straight line. One of the two members is provided with a transmitter capable of generating an ultrasonic pulse excellent both in directivity and in damping characteristics, and the other is provided with a receiver with the same in characteristics as the transmitter and which is disposed in an opposed relation with respect to the transmitter. The distance between the two members is automatically controlled by causing an ultrasonic pulse to be transmitted and received respectively by the transmitter and the receiver.

9 Claims, 11 Drawing Figures

SYSTEM OF AUTOMATICALLY CONTROLLING DISTANCE IN LINEAR MOVEMENT

BACKGROUND OF THE INVENTION

1. Field of the Invention

This invention relates to a method of automatically controlling the position between two moving members at a desired set point in a mechanically contactless member by using an ultrasonic pulse.

2. Prior Art

Various systems of utilizing an ultrasonic wave as a measurement or communication means in water have heretofore been proposed, but there have been many difficulties in finding industrial application of such a proposal to a system of using an ultrasonic wave as a direct measurement means or as a transmission signal between a wave transmitter and a wave receiver in the air and controlling the position between two moving members by use of this measurement means or transmission signal in a mechanically contactless manner, because of the technical restrictions that will be described hereinafter. Namely, (1) When a wave transmitter and receiver are installed adjacent to a mechanical structure (almost all the cases virtually belong to this case), reflected waves overlap transmission waves to thereby make it difficult to transmit accurate ultrasonic pulse, because the area of transmission in which ultrasonic pulses are aerially transmitted is restricted by the mechanical structure. (2) When the wave transmitter and receiver are installed at a short distance from each other and in circumstances where there are many obstacles between them, standing waves tend to be produced and transmission of accurate pulse is difficult. (3) It is necessary for the wave transmitter and receiver to transmit and receive ultrasonic waves, respectively, while the transmitter and receiver are being moved, and trembling of air in accordance with such movement, or vibration coming from the fitting surfaces, or natural convection or the like is sensed as external noise and overlaps with the ultrasonic pulse that is transmitted through the air; accordingly, transmission of accurate ultrasonic pulse has been difficult.

Figure 1A:
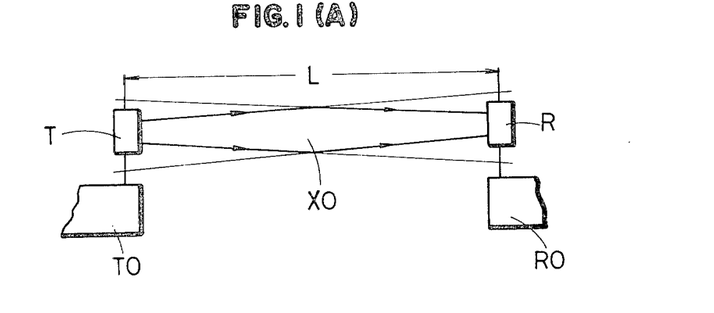
FIG. 1A is a view explaining an aerial transmission system of transmitting an ultrasonic pulse narrow in angle of direction used in the automatic control system according to the present invention.
Figure 1B:
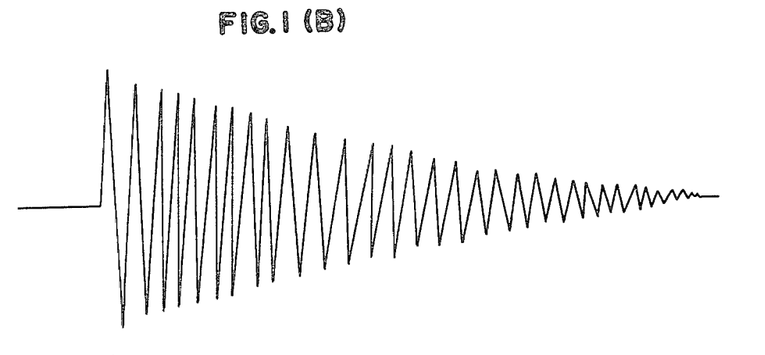
FIG. 1B is a schematic waveform diagram illustrating an ultrasonic pulse which the conventional ultrasonic transmitter emits by excitation of one driving pulse.

Stated more particularly, FIG. 1B is an explanatory view schematically illustrating the ultrasonic pulse which the piezoelectric element of the conventional ultrasonic transmitter generates by one driving pulse. When a driving pulse is applied to the conventional wave transmitter through a pulse transformer, the piezoelectric element is heavily excited by a piezoelectric effect and sends out an ultrasonic pulse of a specified frequency (fo) into the air by a resonance characteristic. The ultrasonic pulse thus sent out shows heavy excitation when the driving pulse is applied to the piezoelectric element, but even after the driving pulse disappears, not only after-vibration continues for a long time, but also vibrations at the rear end face of the thickness vibrator spread through the case and come over to the front end face of the vibrator and leave reverberation and echo thereon slightly later than vibrations at the front end face of the vibrator, thus interferring in the spreading of the pulse. Accordingly, it is considered difficult in practical industrialization to send out an ultrasonic pulse corresponding to the driving pulse, excellent in damping characteristic and narrow in angle of direction. Namely, when a conventional transmitter sends out an ultrasonic pulse and a receiver having the same structure as the transmitter is installed in an opposed relation with the transmitter within a short distance therefrom and when there is an obstacle in the neighborhood of the transmitter and the receiver, the ultrasonic pulse sent out by the transmitter is received by the receiver and reflected by the obstacle and returned in part to the transmitter. At this time, if the transmitter is having after-vibrations, standing waves are generated by reflected waves and after-vibrations, and disturb ultrasonic transmission signals. It is known as an ultrasonic wave characteristic that an angle of direction is narrowed by a thickness vibrator. Therefore, according to the conventional casing method, the vibrations at the rear end face of the thickness vibrator spreading through the case slightly later than the vibrations at the front end face of the vibrator and come over to the front end face and leave reverberation and echo thereon, interfers in the transmission of ultrasonic wave and level down the angle of direction which the thickness vibrator originally has, and makes it difficult to send out a narrow directional ultrasonic pulse. The use of the conventional casing method is, therefore, difficult under the circumstance under which the area of transmission in which the ultrasonic pulse is transmitted is restricted by a mechanical structure. Alternatively, as a method which presently uses the ultrasonic wave between the wave transmitter and the receiver in the air is industrially using a method of detecting the interception of trembling of air or the interception of ultrasonic wave between the transmitter and the receiver. In order to obtain a gain in the transmitter and the receiver used in the method, namely, to make the maximum use of a piezoelectric effect, ultrasonic transmission large in capacity load is practiced by increasing the capacity of the piezoelectric element. On the other hand, because mechanical Q is reduced, such large capacity loaded transmission deters unnecessary radiation other than a limited frequency, and trembling of air responsive to movement, or vibration coming from the fitting surfaces, or natural convection or the like is sensed as external noise and laid over the ultrasonic transmission signals in use to thereby have rendered it difficult to make aerial transmission of an accurate pulse. For this reason, it has long been considered difficult in practical application to use an ultrasonic wave as a control means in the air.

SUMMARY OF THE INVENTION

Accordingly, the primary object of the present invention is to provide a system of controlling that movable position of all the movable members which can be converted into linear movement between a first member and a second member to the position preset by a user through a mechanically contactless intermediary in which an ultrasonic pulse narrow in directivity and high in S/N ratio is used, wherein said first member and said second member are placed in a relatively variable relation in respect of distance between each other on a straight line.

In keeping with the principles of the present invention, the objects are accomplished by a unique system of controlling mechanically connected movable members (not shown) to a desired position so as to permit the movement of the position of the movable members in a specified relation with respect to the distance L between a transmitter T and a receiver R, said system comprising disposing said transmitter and said receiver between two members TO and RO, said transmitter being adapted to emit a narrow directional ultrasonic pulse, said receiver being adapted to receive and convert the pulse into an electrical signal, said members TO and RO interlocking mechanically with the movable members (not shown) which it is desired to control to a desired position and which are placed in a relatively variable relation with each other in respect of distance on a straight line between the members, deciding the distance L between the transmitter T and the receiver R with the time (hereinafter referred to as "propagation time") required for the distance between the transmitter T and the receiver R to have atained the desired distance on the basis of the propagation time required for the ultrasonic pulse generated from the transmitter T to be received by the receiver R installed in an opposed relation with respect to the transmitter T on a straight line, generating a suitable control signal, and controlling the distance L between the transmitter T and the receiver R to the desired distance. In reality, the invention provides a system of controlling two movable members (not shown) to a desired position by (a) detecting the actual distance between the two movable members in terms of aerial transmission distance of ultrasonic wave by emitting an intermittent ultrasonic pulse from the transmitter T at a specified cycle, receiving the pulse by the receiver R and converting the pulse into a receiving pulse, and on the other hand, (b) detecting the intended control distance between the movable members by generating another set pulse, the pulse having a cycle equal to the intended control distance calculated in terms of the propagation time of an ultrasonic wave aerially spreading between the transmitter T and the receiver R, in synchronism with the time at which the ultrasonic pulse is emitted from the transmitter T, using the difference in time between the received pulse and the set pulse when they are inputted into the position control circuit as a control signal, and changing the distance between the transmitter T and the receiver R until the distance between the two members is brought into agreement with the intended control distance. But as described above, this invention is contemplated for controlling distance on a mechanically contactless system by aerially transmitting an ultrasonic pulse between the ultrasonic transmitter T and the receiver R attached to two members TO and RO which are disposed in a relatively variable relation with each other in respect of distance on the same straight line. For this purpose, the transmitter T and receiver send out an ultrasonic pulse corresponding to a driving pulse, excellent in damping characteristic, and narrow in angle of direction, and it is desirable that the ultrasonic pulse should be effectively transmitted in the air without being affected by external noise, standing wave, etc. Before describing the position control system of the present invention, a description will be given of a structure of the transmitter T and receiver R sufficient to satisfy the conditions stated above and a system of transmitting a narrow directional ultrasonic pulse effectively aerially transmitted between the transmitter T and the receiver R.

DETAILED DESCRIPTION OF THE PRESENT INVENTION

Figure 2:
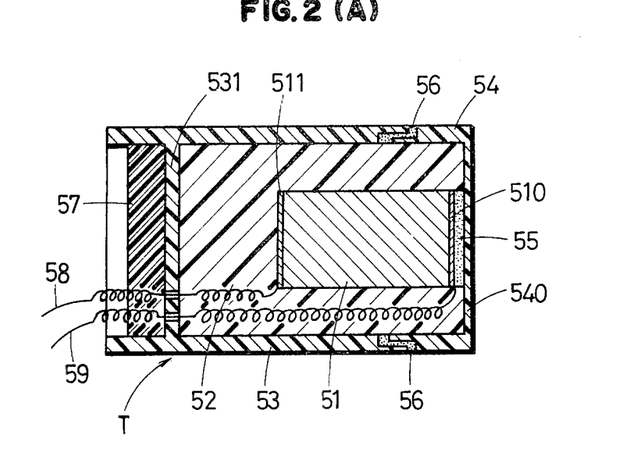
FIGS. 2A and 2B show the ultrasonic transmitter and receiver respectively for aerially transmitting an ultrasonic pulse used in the automatic control system according to the present invention.

Referring now to the ultrasonic pulse transmitter T and the receiver R used in the present invention, both the transmitter T and the receiver R are of entirely the same sectional structure and are arranged at their front end faces in an opposed relation on a straight line and accordingly, a description will be given of the transmitter alone so as to avoid repetition. In FIG. 2A, the transmitter T is constructed by hermetically enclosing a thickness vibrating type piezoelectric element 51 except the front and face portion thereof with a vibration absorbing member or a vibration damping member 52 and sleeving the vibration absorbing or damping member 52 except the front outer periphery thereof into a casing in a contacting relation therewith, putting a front cover 54 on the front outer periphery of the vibration absorbing or damping member 52 in a manner of the cover 54 contacting the casing 53, the cover having a front side protective film 540 excellent in sound transmissivity, placing a vibration transmitting adhesive agent layer 55 acoustically excellent in vibration transmissivity between the front side protective film 540 and the front end face of the piezoelectric element 51, and interposing also a vibration damping adhesive agent layer 56 in the boundary between the casing 53 and the front cover 54. The numerals 58 and 59 designate leads respectively connected to an electrode 511 and an electrode 510. And in the embodiment illustrated the transmitter T is provided in contact with the rear side member 531 of the casing 53 with a vibration absorbing or vibration damping-sealing rear side finishing layer 57. Referring now concretely to each of the above component members, the thickness vibrating type piezoelectric element 51 is formed in a cylindrical shape of well-known piezoelectric element, and is not particularly novel in material and shape. The vibration absorbing or damping member 52 is intended to mainly absorb or damp radial vibrations generated diametrically of the piezoelectric element 51 and thickness vibrations generated from the back side of the element 51 and to support the element 51. Polyurethane and other plastic foams or glass fibers and the like are used as a material for the member 51. The casing 53 is intended to supplementarily absorb those vibrations in the direction of diameter and thickness which could not be absorbed by the absorbing or damping member 52 and also to reinforce the member mechanically and prevent external vibrations from being internally transmitted, and is made, for example, of polyacetal or other hard plastic resins. The front side cover 54 covers the front side of the element 51 with the front side protective film 540 of the cover 51 so as to prevent internal invasion of dust and moisture and surrounds the exposed front outer periphery of the absorbing member 52 and functions in the same manner as the casing 53. The front side protective film 540 vibrates in resonance with the thickness vibrations given by the front of the piezoelectric element 51, vibrates the air in front of the film 540 and facilitates the aerial ultrasonic generation of the thickness vibrations of the film 540. The material of the film 540 is preferably selected from polystyrene and other high-polymer-based soft plastics. A vibration transmitting adhesive agent layer 55 is intended to adhere the element 51 to the film 540 so as to permit vibration, and is selected from non-absorbent agents. The vibration damping adhesive agent layer 56 functions to provide adhesion between the front side cover 54 and the casing 53 and is intended to absorb vibrations so as to prevent so-called "reverberation and resonance" from producing radiating vibrations, the reverberation and resonance being a phenomenon which results from the vibrations which the vibration absorbing or damping member 52 failed to absorb spreading through the casing 53 and interfering in the thickness vibrations given by the front end face of the element 51, accordingly the layer 56 is essential for obtaining a narrow directional ultrasonic wave. The adhesive agent layer 56 shown is indicated in the form of a kind of stepped flange ring increasing stepwise in diameter in the direction of diameter of the element 51 and silicon rubber and other visco-elastic rubber-based adhesive agents are preferably used as a material for the layer 56. A rear side finishing layer 57 provides a sufficient deterrent for thickness vibrations from the rear side of the casing 53 in cooperation with the rear side member 531 of the casing 53 and serves also as a seal for leads 58 and 59. The material used for the finishing layer 57 is a bitumen such as coal tar pitch. But this finishing layer 57 need not necessarily be used if vibration absorption or vibration damping by the casing 53 is sufficient and the leads 58 and 59 are properly sealed. An ultrasonic wave receiver R is constructed in entirely the same manner as above, and therefore, the receiver R is designated by the same reference character as the transmitter T as shown in FIG. 2B. Accordingly, the ultrasonic transmitter T and receiver R having the structure described above are featured in the following:

(1)' Because the front side cover 54 is acoustically separated from the casing 53 by the vibration damping adhesive agent layer 56, the radiating vibrations transmitted from the casing 53 are reduced to such a negligibly small degree in point of practical use that emission of ultrasonic pulse narrow in directivity has been rendered possible. Namely, the area of transmission in which an ultrasonic pulse is transmitted can be made very small like the area of space shown by XO in FIG. 1A which fills two areas of space, one being the area of space which emits ultrasonic pulse small in angle of direction and the other being the area of space in which the receiver R having the same structure as the transmitter T and disposed in an opposed relation with the transmitter T can sense the ultrasonic pulse emitted. Accordingly, even if the transmitter T and receiver R are installed adjacent to a mechanical structure, transmission of accurate ultrasonic pulse has been rendered possible so long as there is no obstacle between the transmitter and the receiver R.

Figure 1C:
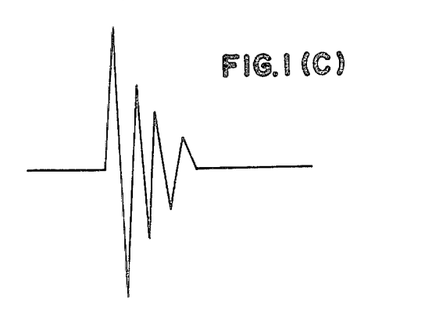
FIG. 1C is a schematic waveform diagram illustrating an ultrasonic pulse which the ultrasonic transmitter according to the present invention emits by excitation of one driving pulse.

(2)' It has been rendered possible to transmit an ultrasonic pulse without affecting standing waves, even if the transmitter T and the receiver R are installed at a short distance from each other and in the circumstances where there are many obstacles in the neighborhood of the transmitter and the receiver, by applying a driving pulse to the piezoelectric element 51 inside the transmitter to thereby vibrate the element 51 with increased amplitude in its first one cycle as shown in FIG. 1C for the purpose of absorbing the after-vibrations of the piezoelectric element 51 by the vibration absorbing member or vibration damping member 52 and to reduce the time constant of an envelope curve of the subsequent damping vibrations of the piezoelectric element 51.

(3)' Because a piezoelectric element capable of providing a minimum ultrasonic output required for ultrasonic waves to reach the distance the user intends to control and high in mechanical Q is used in the transmitter T and receiver R having the structure described above, the transmitter and receiver have been rendered non-sensitive to frequencies except limited frequency. Accordingly, the transmitter does not sense trembling of air or vibrations from the fitting surfaces or natural convection or the like as external noise but is enabled to transmit an exact ultrasonic pulse.

The description given above has made clear the structure of the ultrasonic transmitter T and the receiver R of the present invention and the transmission system on which the ultrasonic pulse narrow in directivity is aerially transmitted effectively between the transmitter and the receiver. In order to simplify a description of the control system that will be described hereinafter, reference will be made to the case in which a distance L between the ultrasonic transmitter T and the receiver R is controlled. The control of the distance intended by the present invention between the movable members connected so as to interlock with each other through the transmitter T and the receiver R will readily be conceivable from the disclosure set forth herein.

Figure 3:
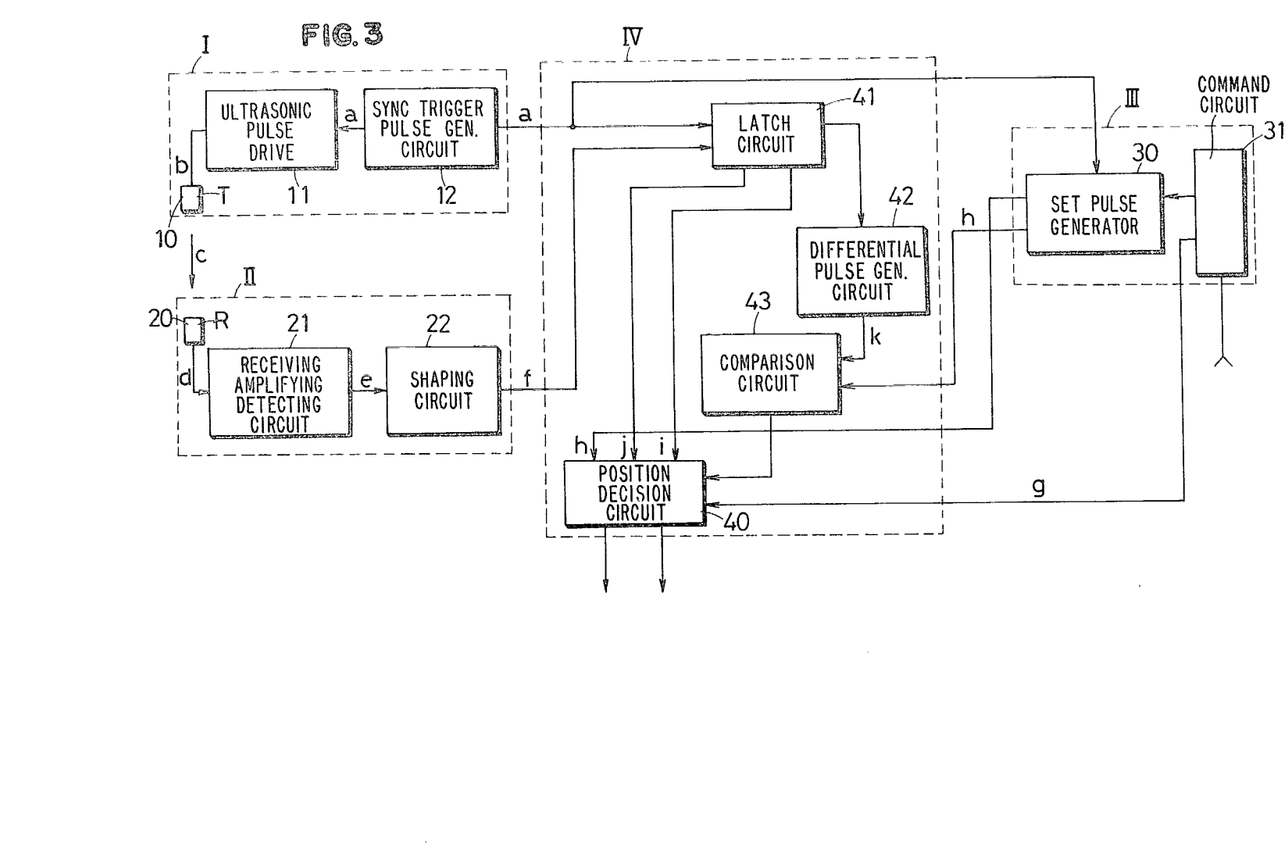
FIG. 3 is a block diagram for effecting automatic control according to the present invention.
Figure 4:
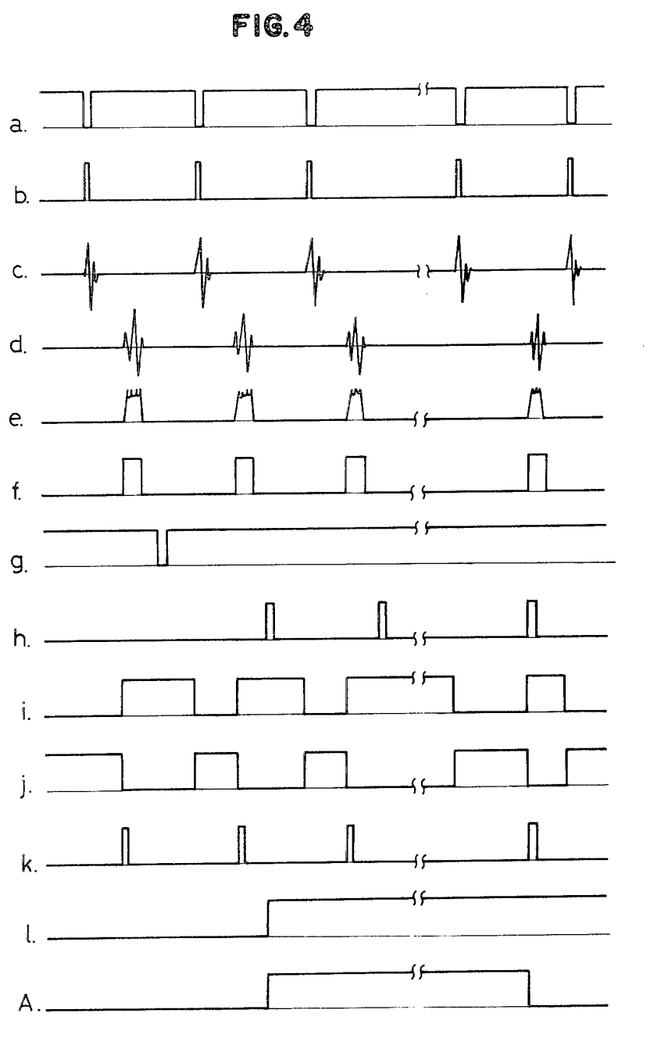
FIG. 4 is a timing chart showing operational waveform of the block diagram of FIG. 3.
Figure 5:
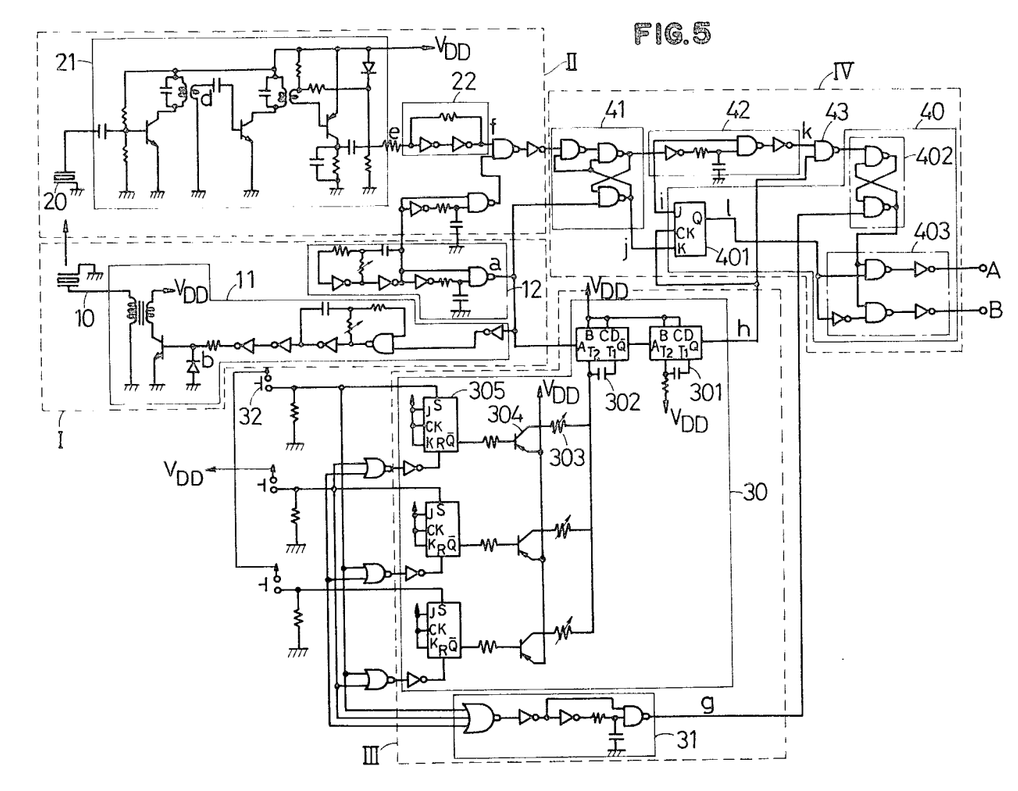
FIG. 5 is an electric circuit diagram having the block diagram of FIG. 3 more concretely embodied therein.

A description will now be given of the principle of control governing the present invention. FIG. 3 shows a block diagram for practicing the present invention; FIG. 4 shows timing charts in portions of a-1 and A and B of FIGS. 3 and 5; and FIG. 5 is an electric circuit diagram more concretely showing the block diagram of FIG. 3. In FIG. 3, the electric circuit for practicing the invention comprises an ultrasonic pulse generation circuit I, an ultrasonic pulse receiving circuit II, a set pulse generation circuit III and a position decision control circuit IV.

Referring schematically to the operating principle of the above circuits along arrows A through K, in the ultrasonic pulse generation circuit I an ultrasonic pulse drive circuit 11 is energized by a trigger pulse as shown in FIG. 4a, generated by a synchronous trigger pulse generation circuit 12 and thereby applies voltage a as shown in FIG. 4b to a piezoelectric element 10 of the transmitter T, the voltage being controlled by the ultrasonic pulse drive circuit 11 to set the pulse width which provides the maximum output and emits ultrasonic pulse as shown in FIG. 4c from the piezoelectric element 10. The ultrasonic waves emitted in the manner described above are received by the receiver R of the ultrasonic pulse receiving circuit II and are amplified, detected and shaped as shown in FIGS. 4d, 4e and 5f by an ultrasonic pulse receiving-amplifying-detecting circuit 21 and a waveform shaping circuit 22, and then inputted into a latch circuit 41 of a position decision control circuit IV in terms of a receiving pulse. A set pulse generation circuit III is designed to change the time constant of a multivibrator 302 by changing the external resistor 303 of the multivibrator 302 by use of setting dials (not shown), and when a push-button switch 32 is turned on, a common circuit 31 sends out a command signal indicated by FIG. 4g and changes the Q-output of R- S F/F 305 into an L-level to thereby excite transistor 304 and a set pulse (FIG. 4h) generated later by the time constant of external resistor 303 than the generation of the trigger pulse (FIG. 4a) is inputted into an agreement-comparison circuit 43 consisting of two-input NAND gate of the position decision circuit IV. Three push-button switches for generating a set pulse are shown in FIG. 5, but only one switch may serve the purpose, and if desired, a plurality of switches may be fitted. Also, the push-button switches are so designed as not to operate more than two at the same time. When a plurality of push-button switches are fitted, it is readily conceivable that kinds of control proportional to the number of push-button switches are possible. For simplicity's sake, operation of the present invention will hereinafter be described by use of a push-button switch 32 alone. A description will now be given in detail of a position decision control circuit IV.

The position decision control circuit IV in the embodiment shown comprises a position decision circuit 40, a latch 41, a rise-up differential pulse generation circuit 42, and an agreement-comparison circuit 43 consisting of a two-input NAND gate. The circuit 40 is designed to input thereinto a receiving pulse (FIG. 4f) received and detected by the receiver R and a set pulse shown generated in FIG. 4h by a set pulse generation circuit III showing the position which the user presets, and the circuit 40 is further designed to detect the order in which the receiving pulse and the set pulse are inputted into the circuit 40 and to make desired control. The input of the latch circuit 41 because the above-mentioned receiving pulse is inputted into the circuit 41, inputs its H-level output into the rise-up differential pulse generation circuit 42 and its L-level output into a K-input terminal of the decision circuit 401 consisting of JK F/F and each time a trigger pulse (FIG. 4a) is inputted into the circuit 41, reverses the output of the trigger pulse as shown in FIG. 4I. Accordingly, even if noise is supplied to the receiver R after the receiving pulse (FIG. 4f) was inputted into the receiver R, the output of the receiver R maintains the described state of latching and is free from undesirable operation. The rise-up differential pulse generation circuit 42 generates an agreement-detection pulse by the rise-up of H-level output of the latch circuit 41, the agreement-detection pulse being shown in FIG. 4k and having the same width as the set pulse (FIG. 4h). The detection circuit 401 consists of JK F/F and is constructed to input the output of the latch circuit 41 into J-input terminal and K-input terminal and to input a set pulse (FIG. 4h) into CK-input terminal. The agreement-comparison circuit 43 consists of a two-input NAND gate which receives the set pulse and the agreement-detection pulse as input and when the circuit 43 is supplied at the same time with the set pulse and the agreement-detection pulse, the circuit 43 feeds a signal to the R-input terminal of a R-S latch circuit 402. When the circuits shown in FIG. 5 start operation, namely when the source of the circuits shown is energized, the R-S latch circuit 402 is designed to be initially reset and locked to the L-input level of the latch circuit. When a push-button switch 32 is not operated, or when the distance between the transmitter T and the receiver R is in agreement with the distance preset by the user and the agreement-detection pulse are inputted into agreement-comparison circuit 43 at the same time, a control command circuit 403 is designed to change output signals A and B to the L-level, and when the push-button switch 32 is turned on, the circuit 403 selects suitably the signal determined by the Q-output of the decision circuit 401 and sends out a signal necessary for control. The distance controlling means is illustrated by the circles coupled to the output of circuit 403 and may comprise a motor, a gas pressure driving means or a hydraulic driving means.

A description will be given more concretely of how the position decision control circuit of the structure described above operates and makes intended position control by an input signal from outside with reference to the case where the actual distance L between the transmitter T and the receiver R is shorter than the set distance desired by the user. But for the sake of ready understanding of the present invention, in the description to be given hereinafter, the description of the present invention is given as the receiver R being locked and the transmitter T alone being movable, and an A-signal is a driving signal for moving the transmitter T away from the receiver R. A B-signal is a driving signal for moving the transmitter T towards the receiver R. In practice, the present invention controls a distance between two movable members TO and RO by grasping a distance L between the transmitter T and the receiver R which detect the distance between the two movable members moving towards and away from each other, and a description will be given of the present invention on the basis of the movement between the transmitter T and the receiver R.

When the power is on to operate the circuits of the embodiment shown, an R-S latch circuit 402 is initially reset as described earlier, to maintain the output of the circuit 402 on an L-level until some command or other is given. For this reason, an L-level signal is inputted into each of two NAND gates of the control signal command circuit 403, the output of the circuit 403 is maintained in the same L-level state as it was before the power was on, with the result that the distance L between the transmitter T and the receiver R is also maintained in the same state as it was before the power was on.

Next, when a push-button switch 32 is pressed after the ultrasonic pulse emitted from the transmitter T was received periodically by the receiver R, the set pulse calculated in terms of time at the distance the user sets and shown in FIG. 4H is inputted as a clock pulse from the CK-terminal of a decision circuit 401, and an H-level signal is outputted, as shown in FIG. 4l of a decision circuit 401, depending upon the state of JK-input at this time. This H-level output signal, together with an H-level signal of the R-S latch circuit 402, is inputted into two NAND gates of a position control signal command circuit 403 to thereby generate the H-level signal at the A-output terminal of the control signal command circuit 403, the H-level signal of the R-S latch circuit 402 having its output reversed by a command signal shown in FIG. 4g generated by depressing a push-button switch 32. Accordingly, the transmitter T is driven by the A-signal so as to be moved further away from the receiver R. While the transmitter T is being driven by the A-signal so as to be moved away from the receiver R, the trigger pulse is repeatedly emitted, and each time the trigger pulse is received by the receiver R as a receiving signal, the decision circuit 401 repeatedly decides the order in which an agreement-detection pulse (FIG. 4k) showing the arrival of the receiving pulse and a set pulse generated by the trigger pulse generation circuit are inputted into the decision circuit 401. As a result, when the distance L between the transmitter T and the receiver R is in agreement with the set distance desired by the user, the set pulse and the agreement-detection pulse as shown in FIGS. 4h and 4k are simultaneously inputted into NAND gate of the agreement-comparison circuit 43, and the NAND gate outputs an L-level signal, with the result that the output of the R-S latch cicuit 402 is reversed to an L-level and the H-level signal indicated in FIG. 4a and outputted by the position command circuit 403 is reversed to the L-level. Accordingly, the A-signal is de-excited to thereby control the distance L between the transmitter T and the receiver R to the distance desired by the user, thus the control operation being completed with the distance being locked to the distance desired.

The control operation to be carried out when the distance L between the transmitter T and the receiver R is longer than the set distance desired by the user will readily be conceivable from the description given above.

Figure 6A:
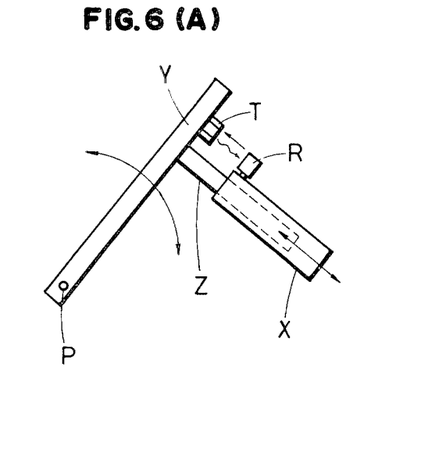
FIGS. 6A through C show suitable embodiments of movement between two members capable of position control in the control system according to the present invention.
Figure 6B:
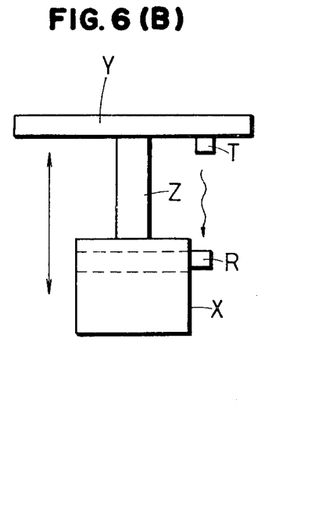
Figure 6C:
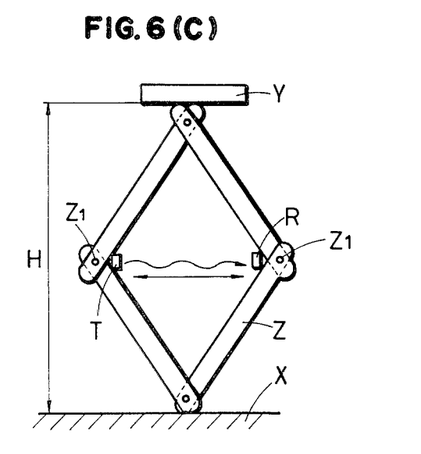

The control system of the present invention may fully be understood from the description above, and as stated in the introduction of this specification, a description will now be given more particularly, with reference to a preferred embodiment of the present invention, of how every kind of position control between two movable members placed in a relatively variable relation with each other with respect to distance on a straight line can be converted into position movement by the use of a method of transmitting an ultrasonic pulse between the transmitter T and the receiver R. FIG. 6A shows a case wherein a movable member Y makes linear expansion and contraction movement around the center of rotation P with respect to a stationary member X, and the angle of inclination of the member Y can be grasped in terms of change in the linear movement between the receiver disposed on the stationary member X and the transmitter T disposed in an opposed relation with the member Y lying on a straight line with respect to the receiver R. Namely, the system of the present invention makes it possible to automatically control a position of inclination by finding out a change in the distance in a straight line between the transmitter T and the receiver R and fully grasping the angle of inclination corresponding to the change obtained. As shown in FIG. 6B, control of an elevatable position is possible by disposing the transmitter T and the receiver R in an opposed relation in a vertical line between the two members X and Y in the movement of the movable member Y elevatable by a piston Z with respect to the stationary member X. In FIG. 6C, the height H of the movable member Y expansible vertically through a pandagraph mechanism Z with respect to the stationary member X (floor member) can be determined by the distance between the transmitter T and the receiver R disposed in a horizontally linearly opposed relation between link pins $Z_1$, $Z_2$, and hence it should be understood that a change in this distance can undoubtedly effect position control of the above height H.

As described above, since it uses a system of aerially transmitting an ultrasonic pulse, the control system of the present invention produces the following heretofore unattained remarkable effects:

(1) Materialization of control of a member to be controlled in a mechanically contactless manner:
  Since a method of aerially transmitting an ultrasonic pulse is employed, position control of a member whose movement of all kinds can be converted into linear movement is rendered possible in a mechanically contactless manner.

(2) Materialization of stepless control:
  Because variable resistance is obtained by changing the time lag of a stepless pulse compared with arrival time of a receiving pulse, a continuous stepless control system unattainable by a mechanical method in which gears and ratchets have conventionally been used has been rendered possible.

(3) Prevention of control error due to changes resulting from the passage of time:
  Because a system of measuring the distance between the transmitter and the receiver by emitting an ultrasonic pulse each time control is made, it has become possible to prevent error due to the wear of gears, ratchets, etc. occurring in a conventional mechanical method so long as there is no deviation in mechanical connection between the member to be controlled and the transmitter and receiver.

We claim:

1. A method of automatically controlling a distance between a first member and a second member one placed in a relatively variable relation in distance with the other on a straight line, said method comprising the steps of:
  (a) disposing an ultrasonic transmitter and an ultrasonic receiver in a mutually opposed relation on a straight line so as to interlock with the linear movement;
  (b) emitting an ultrasonic pulse from said transmitter to said receiver and receiving the pulse by the receiver;
  (c) detecting the ultrasonic pulse received and generating a receiving pulse by an electrical means;
  (d) generating a set pulse lagging for a period of time calculated in terms of time required for an ultrasonic pulse to propagate to a desired distance between said two members in synchronims with generation of the ultrasonic pulse from said transmitter;
  (e) comparing the arrival time of said receiving pulse with that of a set pulse by an electrical means;
  (f) generating a decision signal for deciding the distance between the transmitter and the receiver by said comparison in terms of distance toward and away from a desired distance; and
  (g) controlling the distance between said two members to the desired distance in accordance with said decision signal.

2. A method according to claim 1, wherein said transmitter and receiver comprise an ultrasonic transmitter and receiver comprising a a thickness vibrating type piezoelectric element with a front end face, a vibration absorbing or vibration damping member hemetrically enclosing all of said piezoelectric element except said front end face, a casing enclosing all of said piezoelectric element except said front end face, a front cover being excellent in sound transmissivity provided adjacent the front end face of said piezoelectric element and closing said casing, a vibration transmitting adhesive agent layer between the front side protected film and the front end face of said piezoelectric element, and a vibration damping adhesive agent layer provided between said casing and said front cover.

3. A method according to claim 1, wherein the method of emitting an ultrasonic pulse in said step (b) is carried out by an ultrasonic pulse generation circuit including a synchronous trigger generation circuit for generating a signal pulse having a constant repetition cycle and an ultrasonic pulse drive circuit for exciting the piezoelectric element of the ultrasonic transmitter by inputting the signal pulse into the drive circuit, and a method of receiving said ultrasonic pulse is carried out by a receiver disposed in an opposed relation with said transmitter.

4. A method according to claim 1, wherein said step (c) inputs an excited piezoelectric signal derived from said receiver into an ultrasonic pulse receiving circuit and detects the signal, said pulse receiving circuit comprising a received ultrasonic signal pulse amplification-detection circuit and a waveform shaping circuit.

5. A method according to claim 1, wherein said step (d) generates a set pulse by changing the time constant of a set pulse generation circuit including a monostable multivibrator.

6. A method according to claim 1, wherein said step (f) is carried out by a position decision control circuit including J-K flip-flop.

7. A method according to claim 1, wherein said step (g) is carried out by driving out a motor capable of expanding or contracting (varying) the distance between said two members.

8. A method according to claim 1, wherein said step (g) is carried out by a hydraulic pressure driving means capable of expanding or contracting the distance between said two members.

9. A method according to claim 1, wherein said step (g) is carried out by a gas pressure driving means capable of varying the distance between said two members.

* * * * *